(12) United States Patent
Oljaca et al.

(10) Patent No.: US 9,122,813 B2
(45) Date of Patent: Sep. 1, 2015

(54) USB HOST DETERMINATION OF WHETHER A USB DEVICE PROVIDES POWER VIA A USB COUPLING

(75) Inventors: Miroslav Oljaca, Tucson, AZ (US); Timothy J. Knowlton, Benson, AZ (US); Xiaoliang Xia, Hangzhou (CN)

(73) Assignee: SMSC HOLDINGS S.A.R.L., Luxembourg (LU)

( * ) Notice: Subject to any disclaimer, the term of this patent is extended or adjusted under 35 U.S.C. 154(b) by 105 days.

(21) Appl. No.: 13/413,146

(22) Filed: Mar. 6, 2012

(65) Prior Publication Data
US 2013/0238819 A1    Sep. 12, 2013

(51) Int. Cl.
*G06F 1/26* (2006.01)
*G06F 13/40* (2006.01)

(52) U.S. Cl.
CPC .............. *G06F 13/4081* (2013.01); *G06F 1/26* (2013.01); *G06F 2213/0042* (2013.01)

(58) Field of Classification Search
CPC   G06F 13/4081; G06F 1/26; G06F 2213/0042
USPC .......................................... 710/15
See application file for complete search history.

(56) References Cited

U.S. PATENT DOCUMENTS

| | | | |
|---|---|---|---|
| 6,459,235 B2 | 10/2002 | Odeohhara et al. | |
| 6,549,401 B2 | 4/2003 | Lin et al. | |
| 6,665,801 B1 | 12/2003 | Weiss | |
| 6,774,604 B2 | 8/2004 | Matsuda et al. | |
| 7,262,585 B2 | 8/2007 | May | |
| 7,329,136 B2 | 2/2008 | Su et al. | |
| 7,584,370 B2 | 9/2009 | Zhao | |
| 7,612,527 B2 | 11/2009 | Hoffman et al. | |
| 7,624,202 B2 | 11/2009 | Monks et al. | |
| 7,626,358 B2 | 12/2009 | Lam et al. | |
| 7,631,111 B2 | 12/2009 | Monks et al. | |
| 7,768,150 B2 | 8/2010 | Platania et al. | |
| 7,863,856 B2 * | 1/2011 | Sherman et al. | ............. 320/103 |
| 7,882,297 B2 | 2/2011 | Sisto et al. | |
| 7,969,117 B2 | 6/2011 | Lam et al. | |
| 8,028,178 B2 | 9/2011 | GK et al. | |
| 8,030,900 B2 | 10/2011 | Hussain et al. | |
| 8,035,368 B2 | 10/2011 | May | |
| 8,084,987 B2 | 12/2011 | Hurtz | |
| 2002/0131278 A1 * | 9/2002 | Hendrix | ..................... 363/21.06 |
| 2006/0145666 A1 | 7/2006 | Liu | |
| 2006/0221565 A1 | 10/2006 | Doherty et al. | |
| 2007/0229025 A1 | 10/2007 | Tsai et al. | |
| 2008/0222438 A1 * | 9/2008 | Lin et al. | ........................ 713/340 |
| 2008/0265838 A1 | 10/2008 | Garg et al. | |
| 2008/0290855 A1 | 11/2008 | Fishman | |

(Continued)

*Primary Examiner* — Henry Tsai
*Assistant Examiner* — John Roche
(74) *Attorney, Agent, or Firm* — Slayden Grubert Beard PLLC

(57) ABSTRACT

System and method for a USB host to determine whether or not a USB device provides power via a USB coupling between the USB host and the USB device. At a first time, it may be determined that the USB device is coupled to the USB host via a USB coupling and does not provide power. Power may be provided to the USB device via the USB coupling. At a second time it may be determined that the USB device does provide power via the USB coupling. Power may no longer be provided to the USB device via the USB coupling after it is determined that the USB device does provide power via the USB coupling. A battery of the USB host may be charged using power provided by the USB device via the USB coupling based on determining that the USB device does provide power via the USB coupling.

16 Claims, 6 Drawing Sheets

(56) References Cited

U.S. PATENT DOCUMENTS

| | | |
|---|---|---|
| 2008/0313477 A1 | 12/2008 | Numano |
| 2009/0140772 A1* | 6/2009 | Seth et al. ............... 326/86 |
| 2009/0167245 A1 | 7/2009 | Nguyen |
| 2009/0174366 A1 | 7/2009 | Ahmad et al. |
| 2009/0200378 A1 | 8/2009 | Doherty et al. |
| 2010/0070659 A1 | 3/2010 | Ma et al. |
| 2010/0090644 A1 | 4/2010 | Nokkonen et al. |
| 2010/0093401 A1 | 4/2010 | Moran et al. |
| 2010/0169033 A1* | 7/2010 | Isaksson et al. ............... 702/63 |
| 2010/0298029 A1* | 11/2010 | Jang ............... 455/557 |
| 2011/0016333 A1 | 1/2011 | Scott et al. |
| 2011/0050164 A1 | 3/2011 | Partovi et al. |
| 2011/0258093 A1 | 10/2011 | Antoci |
| 2012/0023351 A1* | 1/2012 | Wakrat et al. ............... 713/322 |

\* cited by examiner

USB HOST DETERMINATION OF WHETHER A USB DEVICE PROVIDES POWER VIA A USB COUPLING

FIELD OF THE INVENTION

The present invention relates to the field of Universal Serial Bus (USB), and more particularly to a system and method for a USB host to determine whether or not a USB device provides power via a USB coupling.

DESCRIPTION OF THE RELATED ART

In recent years, there has been a proliferation of portable devices that utilize power provided by a battery. For example, many people own or purchase various portable devices such as tablet computers, cell phones, music players, video players, and laptops, among other devices. Many of these portable devices include one or more USB ports, which can provide a power and/or data connection between devices.

Conventionally, a USB connection is asymmetrical, such that one side (attached to the 'A' end of the USB cable) is considered the "USB host" while the other side (attached to the "B" end of the USB cable) is considered the "USB device". These relationships have been strictly defined such that if power is provided via the USB connection, it is always provided from the host to the device. Thus a battery-powered device that relies on a USB connection to recharge its battery will typically have a "device" side USB connection. However, using conventional USB connections, this precludes the device from acting as a USB host to other devices.

The versatility of such portable devices has especially increased, such that in some devices, it would be desirable for a portable device to be capable of acting as either a USB host or a USB device. Although the asymmetric nature of USB connections and the strictly defined roles of USB hosts and USB devices have the advantages of providing a safer and more fool-proof means of connecting devices, they are an obstacle to increased versatility of those devices.

Recognizing this, the "on-the-go" (OTG) extension to the USB specification allows for 'AB' ports into which either an 'A' end of a USB cable (designating the device as the USB host) or a "B" end of a USB cable (designating the device as the USB device) may be attached. However, neither the USB specification nor the OTG extension provides a comprehensive system for a USB host to determine whether or not a USB device provides power via a USB coupling. Accordingly, improvements in the field would be desirable.

SUMMARY OF THE INVENTION

In light of the aforementioned shortcomings in the field, it would be desirable for highly versatile portable (e.g., battery powered) devices, such as tablet computers, to recognize the charging needs/capabilities of devices attached to their USB charging ports. For example, it would be desirable for a tablet to distinguish between a device that requires power (e.g., an unpowered docking station) to operate, a device that can store a charge (e.g., a device that has a battery, such as a smart phone) but is not fully charged, and a dedicated charging device (such as an AC-DC wall adapter). Furthermore, it would be desirable for the tablet to be able to detect if the charging needs/capabilities of a device that is already attached to the tablet change. For example, if an unpowered docking station to which the tablet is attached is provided with an external power source, it would be desirable for the tablet to stop providing power to the docking station and begin charging its own battery via the docking station.

Accordingly, various embodiments of a system and method for a first device to determine whether or not a second device provides power via a coupling are presented herein. In some embodiments, the first device may be a USB host, while the second device may be a USB device, and the coupling may be a USB coupling. The USB host may be a portable device, and may include one or more batteries. The USB host may also include one or more USB ports, of which some or all may be USB charging ports configured to provide power to USB devices at a higher level than a basic enumeration level. The USB host may also include device logic configured to implement the method. The method may be performed as follows.

It may be determined that a USB device is coupled to a USB charging port of the USB host. This may provide a USB coupling between the USB host and the USB device. It may be determined that the USB device does not provide power via the USB coupling. For example, the USB device may be a battery powered device or a passive USB device which requires external power (e.g., such as might be provided by a USB host) in order to operate.

In some embodiments, determining that the USB device does not provide power via the USB coupling may include performing a Vbus discharge procedure, also referred to as a current discharge procedure. This may include coupling a Vbus line of the USB coupling to a current discharger. The current discharger may be configured to discharge current on the Vbus line of the USB coupling such that if the USB device does not provide power via the USB coupling, voltage on the Vbus line of the USB coupling will fall below a first threshold within a first period of time after coupling the Vbus line of the USB coupling to the current discharger. Voltage on the Vbus line of the USB coupling may then be measured for the first period of time. Based on this measurement, it may be determined that voltage on the Vbus line of the USB coupling has fallen below the first threshold during the first period of time, which may in turn indicate that the USB device does not provide power via the USB coupling.

It should be noted that in some embodiments, if voltage on the Vbus line of the USB coupling does not fall below the first threshold during the first period of time, it may be determined that the USB device does provide power via the USB coupling.

In some embodiments, after determining that the USB device does not provide power via the USB coupling, the USB host may perform one or more handshake procedures with the USB device via the USB coupling. The USB host may determine an appropriate amount of power to provide to the USB device via the USB coupling based on the one or more handshake procedures.

The USB host may provide power to the USB device via the USB coupling, based on determining that the USB device does not provide power via the USB coupling. The USB host may provide an appropriate amount of power to the USB device in accordance with the one or more handshake procedures, if performed, or may simply passively provide a basic (e.g., enumeration level) amount of power to the USB device via the USB coupling. The USB host may provide the power to the USB device from its own battery, in some embodiments.

At a second time, the USB host may determine that the USB device does provide power via the USB coupling. The USB device may provide power via the USB coupling at the second time as a result of being coupled to an external power source at the second time. For example, in some embodiments, the USB host may be a tablet computer, and the USB device may be a docking station. At the first time, the docking station may be unpowered and may require power from the tablet computer in order to function. At the second time, the docking station may be powered (e.g., plugged into a power outlet), and may not only no longer require power from the tablet computer, but may provide power to the tablet computer via the USB coupling.

In some embodiments, the USB host may determine that the USB device does provide power via the USB coupling by detecting a back drive indication, or a change in current direction, or both, on the Vbus line of the USB coupling. Furthermore, in response to determining that the USB device is providing power via the USB coupling, the USB host may measure one or more of a voltage or a current of the power provided by the USB device via the USB coupling. The USB host may determine whether the power provided by the USB device via the USB coupling is suitable for use by the USB host based on the measured voltage and/or current of the power provided by the USB device.

Thus, in some embodiments, after it is determined that the USB device does provide power via the USB coupling, the USB host may no longer provide power to the USB device via the USB coupling. Furthermore, the USB host may charge its one or more batteries using power provided by the USB device via the USB coupling based on determining that the USB device does provide power via the USB coupling (e.g., if the power provided by the USB device is suitable for use by the USB host).

In some embodiments, at a later time, the USB device may be disconnected (uncoupled) from the USB host's USB charging port and a second USB device may be coupled to a USB charging port of the USB host. This may provide a second USB coupling between the USB host and the second USB device. It may be determined that the second USB device provides power via the second USB coupling. For example, a Vbus discharge procedure may be performed upon determining that the second USB device is coupled to the USB host via the USB charging port.

In a similar manner to the Vbus discharge procedure described above, the Vbus line of the second USB coupling may be coupled to a current discharger. As described above, the current discharger may be configured to discharge current on the Vbus line of the second USB coupling such that if the second USB device does not provide power via the second USB coupling, voltage on the Vbus line of the second USB coupling will fall below a first threshold within a first period of time after coupling the Vbus line of the second USB coupling to the current discharger. However, if the second USB device does provide power via the second USB coupling, voltage on the Vbus line of the second USB coupling will remain above the first threshold for the duration of the first period of time after coupling the Vbus line of the second USB coupling to the current discharger. Voltage on the Vbus line of the second USB coupling may thus be measured for the first period of time. The voltage on the Vbus line of the second USB coupling may not fall below the first threshold during the first period of time, and it may therefore be determined that the second USB device does provide power via the second USB coupling.

The USB host may also measure one or more of a voltage or a current of the power provided by the second USB device via the second USB coupling. The USB host may determine whether the power provided by the second USB device via the second USB coupling is suitable for use by the USB host based on the measured voltage and/or current of the power provided by the second USB device. The USB host may charge its one or more batteries using power provided by the second USB device via the second USB coupling (e.g., if the power provided by the second USB device via the second USB coupling is suitable for use by the USB host), based on determining that the second USB device does provide power via the second USB coupling.

It should be noted that while the above embodiments are described with respect to USB, other protocols and device types are envisioned.

BRIEF DESCRIPTION OF THE DRAWINGS

A better understanding of the present invention can be obtained when the following detailed description of the preferred embodiment is considered in conjunction with the following drawings, in which.

Figure 1:
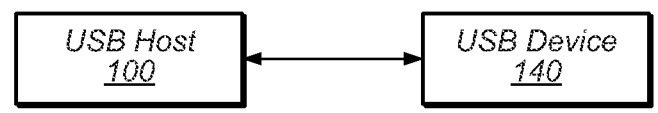
FIG. 1 is a block diagram illustrating an exemplary system suitable for implementing various embodiments of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 7,631,111, titled "System and Method for Rapidly Charging a USB Device", filed Aug. 17, 2006, whose inventors are Morgan H. Monks and Mark R. Bohm; and U.S. patent application Ser. No. 13/285,202, titled "Device Charging Over USB using a Plurality of Handshakes", filed Oct. 31, 2011, whose inventors are Atish Ghosh and Matthew Kalibat.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network and/or other physical transmission medium, that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIGS. 1-2—Exemplary Systems

FIG. 1 illustrates one embodiment of an exemplary system including a USB host 100 and a USB device 140. As shown, the USB host 100 and USB device 140 may be coupled, e.g., via a USB coupling. According to some embodiments, the USB host may be operable to determine whether or not the USB device 140 provides power via the USB coupling.

The USB host 100 may be any of numerous devices. For example, the USB host 100 may be a tablet computer (e.g., tablet 200 illustrated in FIGS. 2A-2D), a laptop or netbook computer, a smart phone, a personal digital assistant (PDA), or any of a variety of other devices configured to act as a USB host. Note that in some embodiments, USB host 100 may be a device which is also configured to act as a USB device (e.g., an on-the-go (OTG) USB device) under appropriate circumstances.

The USB device 140 may also be any of numerous devices. For example, the USB device 140 may be a cell phone (e.g., a smart phone), a personal music player (e.g., player 210 illustrated in FIG. 2A, e.g., an mp3 player, and/or an IPOD™, among other players, a CD player, etc.), a personal video player (e.g., the player 210 illustrated in FIG. 2A, e.g., a digital video player, a DVD player, etc.), a peripheral device (e.g., a printer), an input device (e.g., a game controller, touchpad, mouse, and/or keyboard, among others), or any other USB device.

Figure 2A:
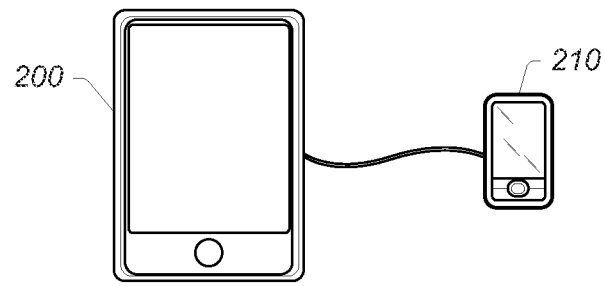
FIGS. 2A-2D illustrate exemplary systems suitable for implementing various embodiments of the invention.
Figure 2B:
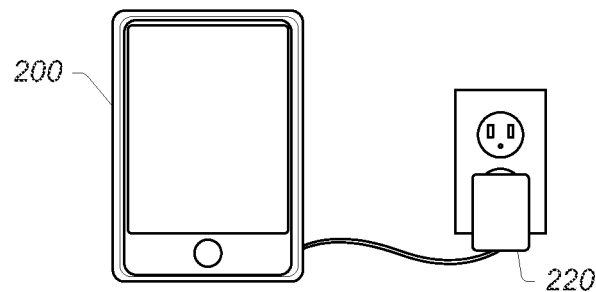
Figure 2C:
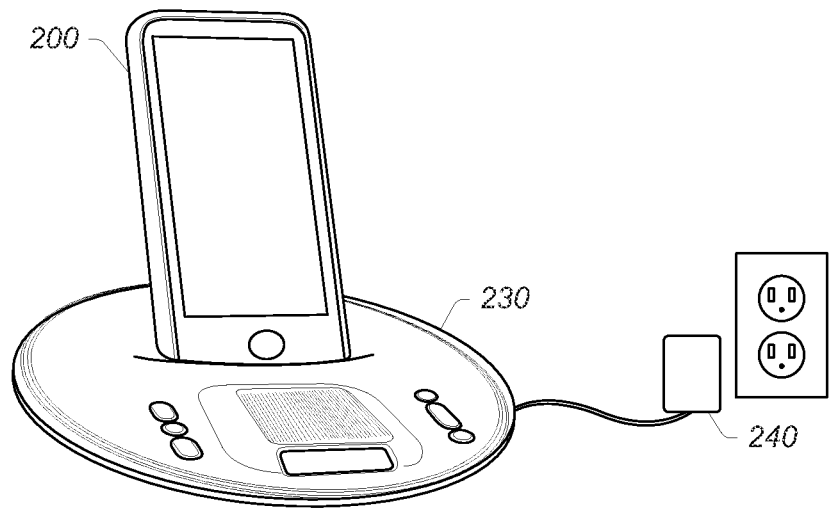
Figure 2D:
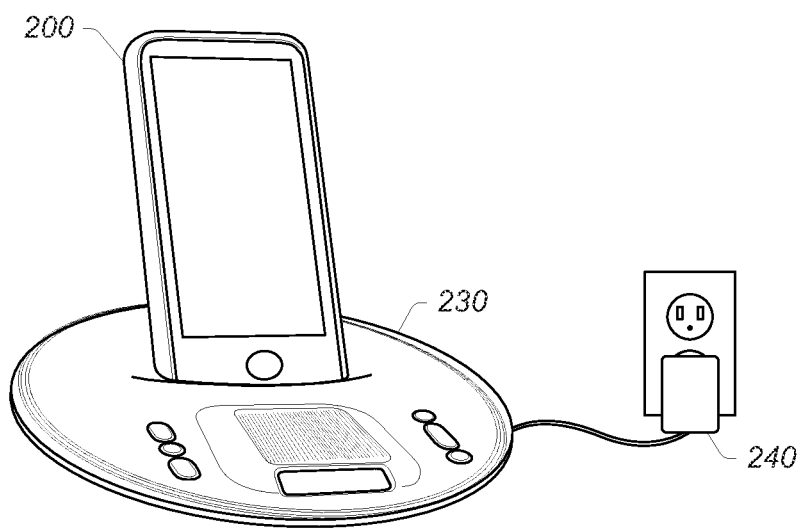

Additionally, the USB device 140 may be an AC adapter (e.g., power adapter 220 illustrated in FIG. 2B) configured to plug into a wall outlet in order to provide power to the USB host 100, or a docking station (e.g., docking station 230 illustrated in FIGS. 2C-2D), which may be an unpowered docking station (e.g., as illustrated in FIG. 2C, with power adapter 240 unplugged) or a powered docking station (e.g., as illustrated in FIG. 2C, with power adapter 240 plugged into a power outlet). Thus, the USB device 140 may be any of a variety of appropriate devices.

The USB host 100 may include device circuitry for operation of the USB host 100, in addition to any other device circuitry for implementing other device functionality. Thus, the USB host may include one or more USB ports for coupling to USB devices (such as USB device 140). Some or all of the USB host's USB ports may be USB charging ports, e.g., USB ports which are configured to provide power above a basic enumeration level. As noted above, the USB host 100 may be a portable device, and may include one or more batteries to facilitate its portability. In addition, USB host 100 may include one or more memory media on which one or more computer programs or software components may be stored. In some embodiments, the memory medium may store operating system software, and/or other software for operation of the USB host (e.g., for controlling the USB port(s)). According to various embodiments, the device circuitry of USB host 100 may be implemented in any of various ways, including analog logic, digital logic, a processor (such as a CPU, DSP, microcontroller, etc.) and memory, an ASIC (application specific integrated circuit), an FPGA (field programmable gate array), or any combination of the above.

Note that the above descriptions of the USB host 100 and the USB device 140 are exemplary only and other components and systems are envisioned. For example, while the foregoing descriptions describe USB enabled devices coupled via USB connections, other types of devices using other communication and/or power provision technologies and standards may alternately or additionally be used in some embodiments.

Figure 3:
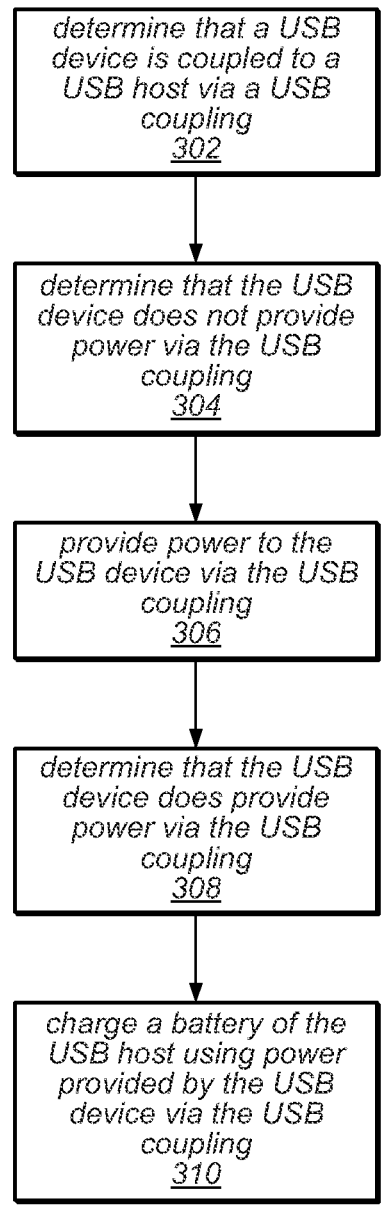
FIG. 3 is a flowchart diagram illustrating a method for detecting power related characteristics of a USB device coupled to a USB charging port according to one embodiment.

FIG. 3—Determining Whether or not a USB Device Provides Power

FIG. 3 illustrates a method for a USB host to determine whether or not a USB device provides power via a USB coupling between the USB host and the USB device. The USB host may also include one or more USB ports, of which some or all may be USB charging ports configured to provide power to USB devices at a higher level than a basic enumeration level. The USB host may be a portable device, and may include one or more batteries. The method shown in FIG. 3 may be used in conjunction with any of the systems or devices shown in the above or below Figures, among other devices. In various embodiments, some of the method elements shown may be performed concurrently, in a different order than shown, or may be omitted. Additional method elements may also be performed as desired. As shown, this method may operate as follows.

In 302, it may be determined that a USB device is coupled to the USB host via a USB coupling. For example, the USB device may be coupled to a USB charging port of the USB host. The USB host may be configured to determine (e.g., detect) that a USB device has been coupled (attached) to one of its USB ports using any of a variety of appropriate methods. For example, the USB host may include attach detection means configured to detect one or more of current pull by the attached device, sound/noise (e.g., a 'click') produced by attachment, communication via data lines of the USB coupling, trigger of a mechanical switch, or any of a variety of other possible means, including a combination of multiple means. In some embodiments, detection of coupling of a USB device to the USB host may be performed automatically by the USB host, e.g., using one or more automatic attach detection means, without any need for user action (e.g., beyond physically coupling the devices). Alternatively, user input indicating that a USB device has been coupled to the USB host may be provided as an attach detection means if desired.

In 304, it may be determined that the USB device does not provide power via the USB coupling. For example, the USB device may be a battery powered device or a passive USB device which requires external power (e.g., such as might be provided by the USB host) in order to operate.

In some embodiments, determining that the USB device does not provide power via the USB coupling may include performing a current discharge procedure on a power-provision line of the USB coupling. Performing a current discharge procedure on the power-provision line of the USB coupling may include attempting to discharge any residual current provided by the USB host (such as current provided as part of attachment detection), such that if the USB device does not provide power, current and/or voltage level on the power provision line may drop significantly, while if the USB device does provide power, the current and/or voltage level on the power provision line may not significantly drop, because of the power provided by the USB device. Such a procedure may also be referred to as a 'Vbus discharge procedure', as the power provision line in a USB coupling may be referred to as the 'Vbus' line.

For example, according to one set of embodiments, the current discharge procedure may include coupling a Vbus line of the USB coupling to a current discharger. The current discharger may be configured to discharge current on the Vbus line of the USB coupling such that if the USB device does not provide power via the USB coupling, voltage (and/or current) on the Vbus line of the USB coupling will fall below a first threshold within a first period of time after coupling the Vbus line of the USB coupling to the current discharger. The first period of time may be configured as desired; according to one set of embodiments, the first period of time may be 100 ms. However, a shorter (e.g., 10 or 50 ms) or longer (e.g., 500 ms or 1 s) period of time may be used as the first period of time, as desired. Voltage (and/or current) on the Vbus line of the USB coupling may then be measured for the first period of time. Based on this measurement, it may be determined that voltage (and/or current) on the Vbus line of the USB coupling has fallen below the first threshold during the first period of time, which may in turn indicate that the USB device does not provide power via the USB coupling.

It should be noted that while the above-described current discharge procedure may be one means of determining whether the USB does or does not provide power via the USB coupling, other means of determining whether or not the USB device provides power via the USB coupling may be used as an alternative or in addition.

In some embodiments, after determining that the USB device does not provide power via the USB coupling, the USB host may perform one or more handshake procedures with the USB device via the USB coupling. The USB host may determine an appropriate amount of power to provide to the USB device via the USB coupling based on the one or more handshake procedures. For example, if the USB device is a portable device with a battery, the handshake procedure(s) may be used to determine whether or not the battery of the portable device needs charging and/or what power level (e.g., current level) the device is configured to accept.

In 306, power may be provided to the USB device via the USB coupling. The USB host may provide the power to the USB device from its own battery, in some embodiments. The USB host may provide power to the USB device based on determining that the USB device does not provide power via the USB coupling. In some embodiments, power may be provided to the USB device also based on the handshake procedure(s), if performed. For example, the USB host may provide an appropriate amount of power to the USB device in accordance with the one or more handshake procedures, if performed.

It should be noted that in some embodiments, the USB host may determine (e.g., based on the handshake procedure(s)) that the USB host does not require power via the USB coupling. For example, the USB device might have a fully-charged battery. In this case, the USB host may not provide power to the USB device via the USB coupling.

Alternatively, the USB host may simply passively provide a basic amount of power to the USB device via the USB coupling. This may not require that any handshake procedure(s) be performed.

In 308, at a second time, it may be determined that the USB device does provide power via the USB coupling. The USB device may provide power via the USB coupling at the second time as a result of being coupled to an external power source at the second time. For example, in some embodiments, the USB host may be a tablet computer, and the USB device may be a docking station. At the first time, the docking station may be unpowered and may require power from the tablet computer in order to function. At the second time, the docking station may be powered (e.g., plugged into a power outlet), and may not only no longer require power from the tablet computer, but may also provide power to the tablet computer via the USB coupling. It should be noted that while an unpowered/powered docking station and tablet is one example of a possible USB device/USB host relationship in which the USB device may change from drawing power to receiving power (or vice versa) while USB coupled to the USB host, other device relationships (e.g., between different types of devices with different powered/unpowered configurations) are also possible.

In some embodiments, the USB host may determine that the USB device does provide power via the USB coupling by detecting a back drive indication, or a change in current direction, or both, on the Vbus line of the USB coupling. After it is determined that the USB device does provide power via the USB coupling, the USB host may no longer provide power to the USB device via the USB coupling. This may be desirable, in particular if the USB host was providing power from its battery, as providing power from its battery would reduce the battery life of the device acting as the USB host.

In 310, a battery of the USB host may be charged using power provided by the USB device via the USB coupling. For example, the USB host may charge its one or more batteries using power provided by the USB device via the USB coupling based on determining that the USB device does provide power via the USB coupling.

In some embodiments, in response to determining that the USB device is providing power via the USB coupling and prior to charging the battery of the USB host, the USB host may measure one or more of a voltage or a current of the power provided by the USB device via the USB coupling. The USB host may determine whether the power provided by the USB device via the USB coupling is suitable for use by the USB host based on the measured voltage and/or current of the power provided by the USB device. If the power provided by the USB device via the USB coupling is not suitable for use by the USB host (e.g., if the power is at a higher voltage than the USB host is configured to use), the USB host may not use the power provided by the USB device. For example, it may not be desirable for a device configured to use 5V power to attempt to use 12V power, as this might damage circuitry of the device, depending on its configuration.

In some embodiments, at a later time, the USB device may be disconnected (uncoupled) from the USB host's USB charging port and/or a second USB device may be coupled to a USB charging port of the USB host. This may provide a second USB coupling between the USB host and the second USB device. The USB host may detect that the second USB device has been attached via the second USB coupling, e.g., using any of the previously described attachment detection means.

The second USB device may be a device which provides power via the second USB coupling. For example, the second USB device may be a dedicated charging device, e.g., an AC/DC adapter plugged into a power socket (e.g., a wall outlet). It may thus be determined that the second USB device provides power via the second USB coupling. Any of a variety of means may be used to determine that the second USB device provides power via the second USB coupling. Once such technique is to use a current (or Vbus) discharge procedure, such as the previously described current discharge procedure, upon determining that the second USB device is coupled to the USB host via the USB charging port.

For example, in one set of embodiments, the Vbus line of the second USB coupling may be coupled to a current discharger. The current discharger may be configured to discharge current on the Vbus line of the second USB coupling such that if the second USB device does not provide power via the second USB coupling, voltage (and/or current) on the Vbus line of the second USB coupling will fall below a first threshold within a first period of time after coupling the Vbus line of the second USB coupling to the current discharger. However, if the second USB device does provide power via the second USB coupling, voltage (and/or current) on the Vbus line of the second USB coupling will remain above the first threshold for the duration of the first period of time after coupling the Vbus line of the second USB coupling to the current discharger. Voltage (and/or current) on the Vbus line of the second USB coupling may thus be measured for the first period of time. The voltage (and/or current) on the Vbus line of the second USB coupling may not fall below the first threshold during the first period of time, and it may therefore be determined that the second USB device does provide power via the second USB coupling.

The USB host may also measure one or more of a voltage or a current of the power provided by the second USB device via the second USB coupling. The USB host may determine whether the power provided by the second USB device via the second USB coupling is suitable for use by the USB host based on the measured voltage and/or current of the power provided by the second USB device. The USB host may then charge its one or more batteries using power provided by the second USB device via the second USB coupling (e.g., if the power provided by the second USB device via the second USB coupling is suitable for use by the USB host), based on determining that the second USB device does provide power via the second USB coupling.

It should be noted that while the above embodiments are described with respect to USB, other protocols and device types are envisioned.

Figure 4A:
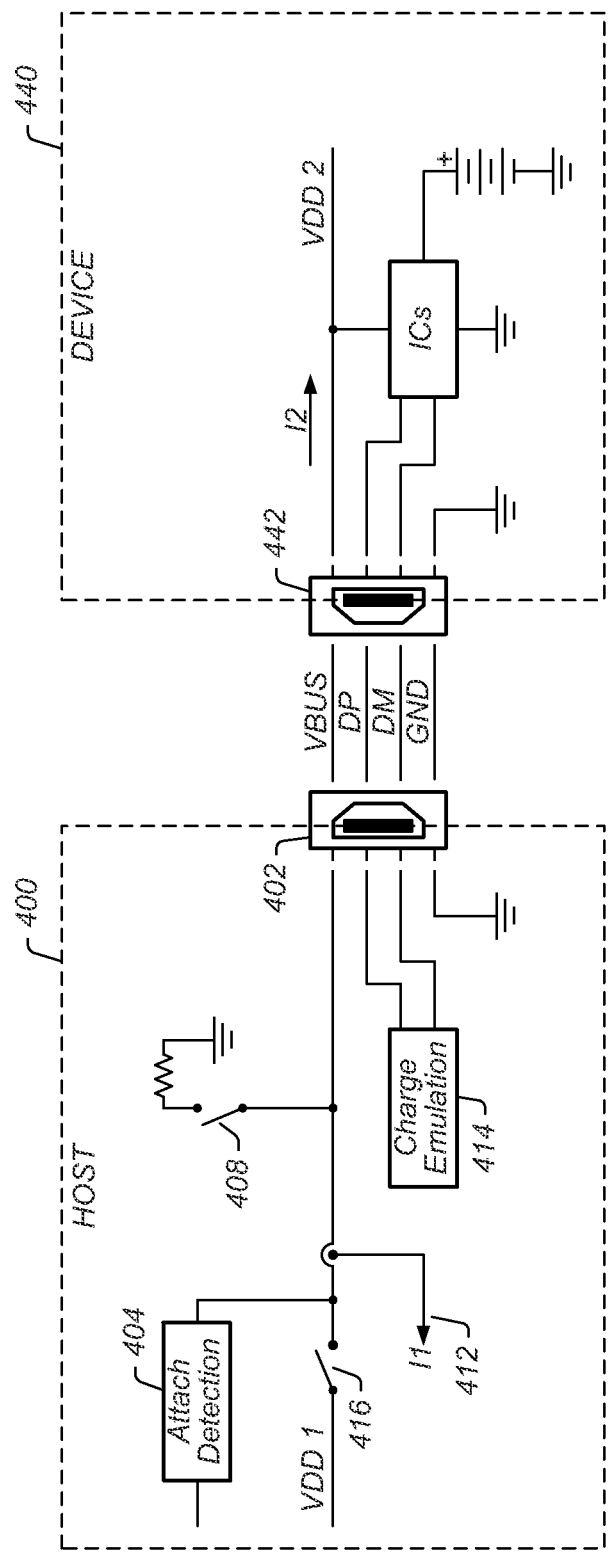
FIGS. 4A-4C illustrate various embodiments of a system including a USB host and a USB device coupled via a USB coupling.
Figure 4B:
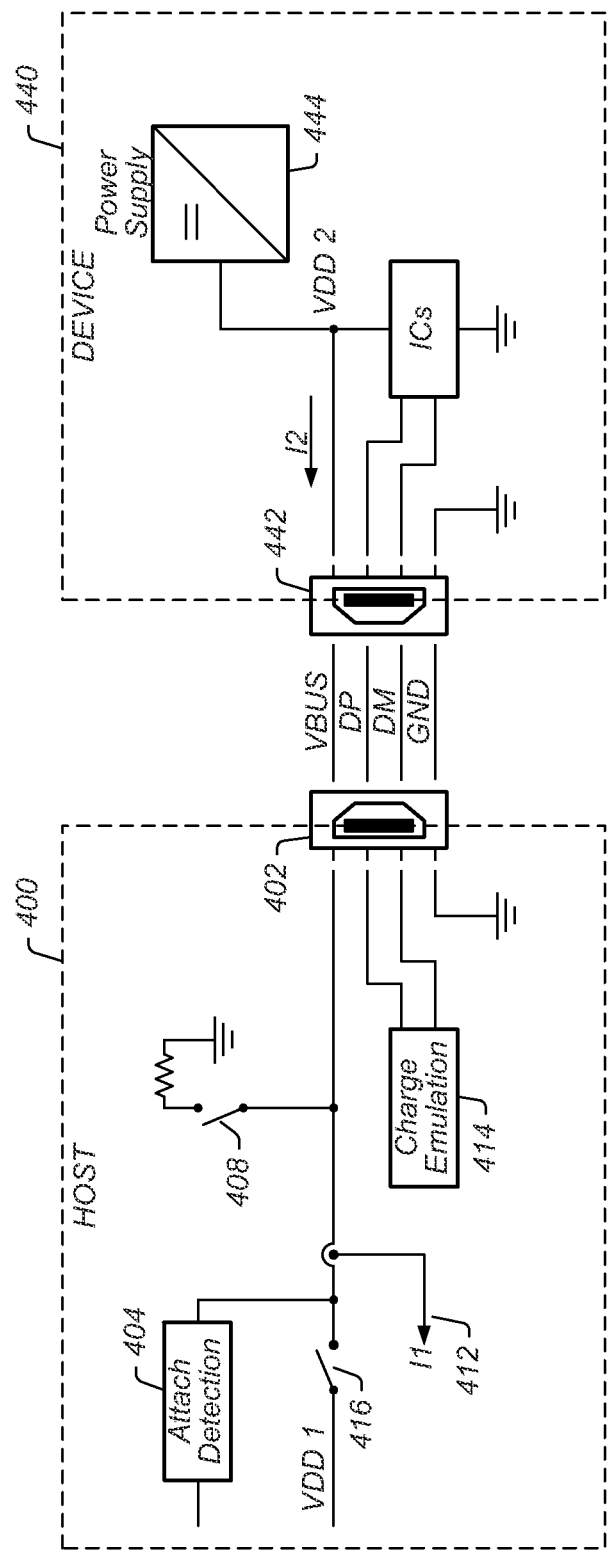
Figure 4C:
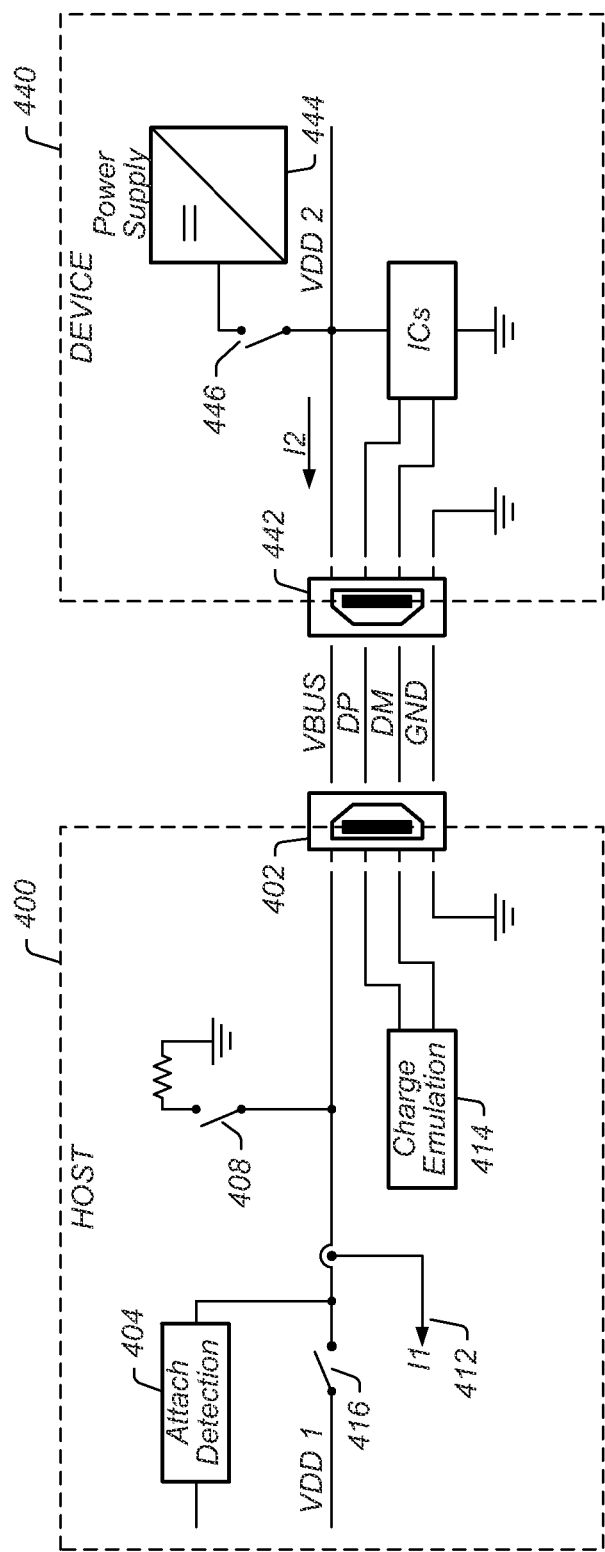

FIGS. 4A-4C—Diagrams Illustrating Embodiments of a System Including a USB Host and a USB Device Coupled Via a USB Coupling FIGS. 4A-4C are diagrams illustrating various possible embodiments of a system including a USB host and a USB device coupled via a USB coupling. Each of FIGS. 4A-4C may be representative of a different USB host-USB device relationship according to some embodiments. For example, FIG. 4A illustrates a scenario in which USB device 440 is a battery-powered device, e.g., which may not provide power via the USB coupling, and in fact may use power provided via the USB coupling to operate and/or may to charge its battery. It should be noted that while in some embodiments a battery-powered USB device may not provide power via the USB coupling, in other embodiments (e.g., as noted below with respect to FIG. 4C), a battery-powered USB device may alternatively or additionally be configured to provide power via the USB coupling under some circumstances. For example, in one set of embodiments, depending on relative charge levels of the USB host battery and USB device battery, either of the USB host or the USB device may provide power to the other via the USB coupling.

FIG. 4B illustrates a scenario in which the USB device 440 is a dedicated charger, i.e., a device which is capable of providing power to the USB host via the USB coupling.

FIG. 4C illustrates a scenario in which the USB device 440 requires power to function (e.g., does not have an internal power source, or is switchably coupled to an internal or external power source), which power may be provided either by the USB host 400 (i.e., over the USB coupling) or by an alternative power source, such as power supply 444. It should be noted that while power supply 444 is shown in FIG. 4C as being located within USB device 440, according to various embodiments power supply 444 may be implemented as any of a variety of external or internal power sources, including but not limited to: an internal DC power supply (e.g., a battery); an external AC power supply (e.g., via an AC/DC wall adapter to convert an AC power supply to a DC power supply external to the USB device 440, or via an AC/DC converter to convert the AC power supply to a DC power supply internal to the USB device 440); or an external DC power supply.

In each of FIGS. 4A-4C, a USB coupling may be provided between the USB host 400 and the USB device 440. The USB coupling may be provided by attaching a USB cable between a host-side USB port 402 and a device-side USB port 442. The USB coupling may include a Vbus line (e.g., for providing power), DP and DM lines (e.g., for providing data communications), and a ground line.

The USB host may include an attach detection circuit 404. The attach detection circuit 404 may be configured to detect the coupling of a USB device 440 to the USB host 400 via the USB port 402. The attach detection circuit 404 may be configured to detect such a coupling by any of a variety of means, including current pull, sound/noise, communication via the DP/DM lines, trigger of a mechanical switch, or any other means of detecting attachment of USB device 440 to USB host 400, including a combination of multiple means. As one example, the attach detection circuit 404 might be configured to provide a very small current (e.g., 2 mA, or any other desired amount) in order to detect attachment of a USB device to the USB host's USB port.

Upon detecting the attachment of USB device 440 to USB host 400, device logic in USB host 400 may initiate a "Vbus discharge procedure" intended to determine whether or not USB device 440 is providing power via the USB coupling. In the Vbus discharge procedure, switch 408 may be closed, thereby coupling the Vbus line to a current discharger (or "current discharge unit"). The current discharge unit may function to discharge current (e.g., residual current from the attach detection circuit 404, if current pull is used as a means of attachment detection) by means of a resistor, as shown, or may discharge current using any of a variety of other means, including a combination of a multiple resistors and/or more complex circuits, as desired.

The current discharger may be configured to discharge current on the Vbus line such that if the USB device 440 does not provide power via the USB coupling (e.g., if the USB device requires power to operate or charge its battery, as in FIG. 4A), current and/or voltage on the Vbus line will fall (or remain) below a first threshold (e.g., within a pre-configured amount of time). In other words, the Vbus line may be pulled low. If the USB device 440 does provide power via the USB coupling (e.g., if the USB device is a dedicated charger coupled to an external power source, as in FIG. 4B), the power supply may provide more current than the current discharger can discharge, and current and/or voltage on the Vbus line may not fall below the first threshold. In other words, the Vbus line may be pulled high. Thus, a measurement of current and/or voltage on the Vbus line (e.g., a measurement of I1 412, possibly for the pre-configured amount of time) may provide an indication of whether the USB device 440 provides power via the USB coupling. In one set of embodiments, one or more of the measurements may be performed using an analog-to-digital converter (ADC); other means of measuring or estimating the current/voltage, such as a threshold comparator, may alternatively or additionally be used. After the Vbus discharge procedure, switch 408 may be opened, such that the current discharger is no longer coupled to the Vbus line.

If the Vbus discharge procedure indicates that the USB device 440 does not provide power, the USB host 400 may perform one or more handshake procedures with the USB device 440 to determine an appropriate power level (e.g., amount of current) to provide to the USB device 440. For example, in one set of embodiments, charge emulation circuit 414 may perform the one or more handshake procedures, e.g., using the DP and DM lines. After an appropriate power level has been determined via the one or more handshake procedures, the USB host 400 may close switch 416 and provide the determined appropriate amount of power to the USB device 440 via the USB coupling. Alternatively, the USB host 400 may close switch 416 after determining that the USB device 440 does not provide power and passively provide a basic level of power to the USB device 440 without requiring any negotiation.

If the Vbus discharge procedure indicates that the USB device 440 does provide power, the USB host 400 may perform one or more measurements on the power provided by the USB device 440 (e.g., current and/or voltage) in order to determine whether the power provided by the USB device 440 is suitable for use by the USB host 400. In one set of embodiments, one or more of the measurements may be performed using an ADC, such as the ADC described above with respect to the Vbus discharge procedure. If the power provided by the USB device 440 is suitable for use by the USB host 400, the USB host 400 may charge its battery using the power provided by the USB device 440.

In the case of FIG. 4C, consider a situation in which the USB host 400 is coupled to the USB device 440 at a time when the USB device 440 is not coupled to power supply 444. After detecting the attachment of USB device 440, the Vbus discharge procedure may be initiated, and may indicate that the USB device 440 does not provide power via the USB coupling. In this case, the USB host 400 may then provide power to the USB device 440.

However, if at a later time the USB device 440 is coupled to power supply 444 (e.g., if a user plugs a power adapter of the USB device 440 to a power outlet, illustrated in FIG. 4C as closing switch 446), the power supply 444 may then provide the current (e.g., I2) necessary for operation of the USB device 440. The power supply 444 may further provide power to the USB host via the USB coupling, e.g., using which the USB host may charge its battery.

In this case the current that was provided by the USB host 400 (e.g., I1) may go to zero and then change direction. The USB host 400 may be configured to detect such a change in current direction, e.g., using a bi-directional ADC configured to measure sink current as well as source current, or using another means. Additionally, in some embodiments, a back drive indication may occur. The USB host 400 may be configured to detect a significant difference in voltage (e.g., 150 mV, in some embodiments; other higher or lower values are also possible) between the Vbus line and the USB host 400 provided voltage (e.g., VDD1). This may be referred to as a "back drive indication", and the USB host 400 may be configured to detect such events in order to detect faults at the USB host 400. Since a back-drive indication may also be useful as an indication that USB device 440 may have been coupled to an external power supply. The USB host 400 may be configured to measure one or both of voltage or current on the Vbus line in response to detecting a change in direction of current or a back drive indication, in order to determine whether or not the USB device 440 is providing power suitable for use by the USB host 400. If the power provided by the USB device 440 is suitable for use by the USB host 400, the USB host 400 may charge its battery using the power provided by the USB device 440.

Similarly, if at a later time the power supply 444 is disconnected (e.g., illustrated as opening of switch 446 in FIG. 4C), the USB host 400 may be configured to detect a change in the direction of the current provided by the USB host 400 (e.g., I1) and/or a back drive indication and thereby determine that the USB device 440 no longer provides power via the USB coupling. The USB host 400 may then perform one or more handshake procedures to determine an appropriate power level to provide to the USB device 440 via the USB coupling and subsequently provide power at the determined level to the USB device 440 via the USB coupling. Alternatively, the USB host 400 may simply passively provide a basic level of power to the USB device 440 via the USB coupling without performing any handshake procedures.

Thus, the USB host 400 may be capable of detecting whether or not the USB device 440 provides power via the USB coupling, including detecting if the USB device 440 changes from drawing power from the USB host 400 via the USB coupling to providing power to the USB host 400 via the USB coupling, or vice versa.

While the systems and methods discussed herein are described with respect to USB devices, other protocols and device types are envisioned.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system configured to act as a USB host, comprising:
a battery;
a USB charging port for coupling to USB devices;
device logic,
wherein the device logic is configured to:
determine that a USB device is coupled to the USB charging port, thereby providing a USB coupling between the USB host and the USB device;
determine whether the USB device is providing power via the USB coupling, wherein the USB host detects a change in current direction on a Vbus line of the USB coupling; and
based on detecting a change in current direction on the Vbus line, the USB host compares the voltage provided by the Vbus line and a voltage available from the USB host to detect a back drive indication;
if determined that the USB device is not providing power, the device logic is further configured to:
determine a power level for providing power to the USB device wherein the power level is determined based on one or more handshake procedures; and
provide power at the determined power level to the USB device via the USB coupling;
if determined that the USB device is providing power, the device logic is further configured to:
determine whether the power provided by the USB device can be used to charge the battery of the USB host; and
based on determining that the power provided by the USB device can be used to charge the battery of the USB host, charge the battery using power provided by the USB device via the USB coupling.

2. The system of claim 1, wherein in order to determine whether the USB device is providing power via the USB coupling, the device logic is configured to:
couple a Vbus line of the USB coupling to a current discharger, wherein the current discharger is configured to discharge current on the Vbus line of the USB coupling such that if the USB device does not provide power via the USB coupling, voltage on the Vbus line of the USB coupling will fall below a first threshold within a first period of time after coupling the Vbus line of the USB coupling to the current discharger;
measure voltage on the Vbus line of the USB coupling for the first period of time; and
determine that voltage on the Vbus line of the USB coupling has fallen below the first threshold during the first period of time.

3. The system of claim 2, wherein if voltage on the Vbus line of the USB coupling does not fall below the first threshold during the first period of time, the device logic is configured to determine that the USB device does provide power via the USB coupling.

4. The system of claim 1, wherein the USB device does provide power via the USB coupling as a result of being coupled to an external power source.

5. The system of claim 1, wherein the device logic is further configured to: measure one or more of a voltage or a current of power provided by the USB device via the USB coupling; and determine whether the power provided by the USB device via the USB coupling is suitable for use by the system.

6. The system of claim 1, wherein the system is a tablet computer, wherein the USB device is a docking station.

7. The system of claim 1, wherein the device logic is configured to provide power from the battery to the USB device via the USB coupling.

8. A method for a USB host to determine whether or not a USB device provides power via a USB coupling between the USB host and the USB device, the method comprising:
determining that the USB device is coupled to the USB host via a USB coupling;
determining whether the USB device is providing power via the USB coupling, wherein the USB host detects a change in current direction on a Vbus line of the USB coupling, and based on detecting a change in current direction on the Vbus line, the USB host compares the voltage provided by the Vbus line and a voltage available from the USB host to detect a back drive indication;
if determined that the USB device is not providing power, the method further comprising:
determining a power level for providing power to the USB device wherein the power level is determined based on one or more handshake procedures; and providing power at the determined power level to the USB device via the USB coupling;
if determined that the USB device is providing power, the method further comprising: determining whether the power provided by the USB device can be used to charge a battery of the USB host; and
based on determining that the power provided by the USB device can be used to charge the battery of the USB host, charging the battery of the USB host using power provided by the USB device via the USB coupling.

9. The method of claim 8, wherein determining whether the USB device is providing power via the USB coupling comprises:
coupling a Vbus line of the USB coupling to a current discharger, wherein the current discharger is configured to discharge current on the Vbus line of the USB coupling such that if the USB device does not provide power via the USB coupling, voltage on the Vbus line of the USB coupling will fall below a first threshold within a first period of time after coupling the Vbus line of the USB coupling to the current discharger;
measuring voltage on the Vbus line of the USB coupling for the first period of time; and
determining that voltage on the Vbus line of the USB coupling has fallen below the first threshold during the first period of time.

10. The method of claim 9, wherein if voltage on the Vbus line of the USB coupling does not fall below the first threshold during the first period of time, it is determined that the USB device does provide power via the USB coupling.

11. The method of claim 8, wherein the USB device does provide power via the USB coupling as a result of being coupled to an external power source at the second time.

12. The method of claim 8, further comprising measuring one or more of a voltage or a current of power provided by the USB device via the USB coupling; and determine whether the power provided by the USB device via the USB coupling is suitable for use by the system.

13. The method of claim 8, wherein the USB host is a tablet computer, wherein the USB device is a docking station.

14. The method of claim 8, wherein said providing power to the USB device via the USB coupling comprises providing power from the battery of the USB host.

15. A system configured to act as a USB host, comprising:
a battery;
a USB charging port for coupling to USB devices;
device logic, wherein the device logic is configured to:
determine that a USB device is coupled to the USB charging port, thereby providing a first USB coupling between the USB host and the USB device;
determine whether the USB device is providing power via the USB coupling wherein the USB host detects a change in current direction on a Vbus line of the USB coupling and the USB host compares the voltage provided by the Vbus line and a voltage available by the USB host to detect a back drive indication;
if determined that the USB device is not providing power, the device logic is further configured to:
determine a power level for providing power to the USB device wherein the power level is determined based on one or more handshake procedures; and
provide power at the determined power level to the USB device via the first USB coupling;
if determined that the USB device is providing power, the device logic is further configured to:
determine whether the power provided by the USB device can be used to charge the battery of the USB host; and
based on determining that the power provided by the USB device can be used to charge the battery of the USB host, charge the battery using power provided by the USB device via the USB coupling.

16. The system of claim 15, wherein upon determining that a USB device is coupled to the USB charging port, the device logic is configured to:
couple a Vbus line of the USB coupling to a current discharger, wherein the current discharger is configured to discharge current on the Vbus line of the USB coupling such that if the USB device does not provide power via the USB coupling, voltage on the Vbus line of the USB coupling will fall below a first threshold within a first period of time after coupling the Vbus line of the USB coupling to the current discharger; and
measure voltage on the Vbus line of the USB coupling for the first period of time; wherein if voltage on the Vbus line of the USB coupling falls below the first threshold during the first period of time, the device logic is configured to determine that the USB device does not provide power via the USB coupling; wherein if voltage on the Vbus line of the USB coupling does not fall below the first threshold during the first period of time, the device logic is configured to determine that the USB device does provide power via the USB coupling.

* * * * *